Feb. 7, 1961   H. T. FINDLAY   2,970,926
CARBON PAPER
Filed Nov. 14, 1957
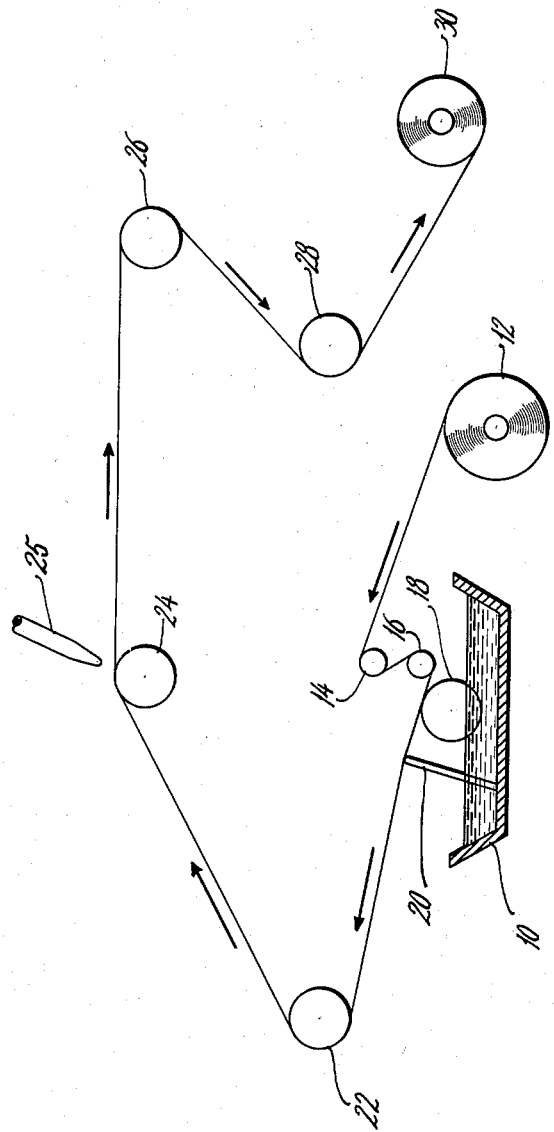
INVENTOR
HUGH T. FINDLAY
BY
ATTORNEY

United States Patent Office 2,970,926
Patented Feb. 7, 1961

2,970,926

CARBON PAPER

Hugh Thomas Findlay, Lexington, Ky., assignor, by mesne assignments, to Underwood Corporation, New York, N.Y., a corporation of Delaware Filed Nov. 14, 1957, Ser. No. 696,402

4 Claims. (Cl. 106—171)

This invention relates to coating compositions and more particularly to a process for obtaining a coating composition that is applied to paper for the purpose of producing carbon copies made from pen or pencil writing generally known by those skilled in the art as "pencil carbons."

It is conventional practice to produce carbon paper having a marking coating composed of waxes, oils and colors. When in use a large part of the solid waxes are transferred to the copy sheet. This results in tackiness between the solid ink and the transfer sheet. Moreover the ink on the waxes is a solid ink and does not penetrate the paper, so that the carbon copy is sensitive to handling and has a tendency to smudge. In view of this the durability of the wax base of the carbon coating must be sacrificed to reduce tack and smudge.

It is therefore proposed to substitute for the waxes in the above inking composition, a thermoplastic ester which suspends the colored oil on the carbon paper. When pressure is applied by a writing instrument to the uncoated side of the transfer sheet, the pressure is transmitted to the inked side, and this causes a small quantity of the colored oil to be squeezed out. Although the ester coating may be broken by pressure, in general it acts like a resilient sponge, out of which the oil may be squeezed to transfer the color to the copy paper. There is in general therefore no adherence of the ester to the copy paper, thus no tackiness can occur.

This invention provides an advantageous coating for such paper and a method of producing it, the method comprising:

Making a homogeneous mixture of 1.75 to 2.75 parts of castor oil and .75 to 1.50 parts of coloring material in the form of a coloring agent in an appropriate vehicle, and causing the mixture to mix with and wet 1 part of cellulose acetate butyrate dissolving the cellulose acetate butyrate so wetted in such a proportion of a volatile solvent for butyrate to make the solution cling in proper quantities to paper but to have a viscosity of less than 1000 centipoises, coating one side of a sheet of paper with such solution and evaporating the volatile solvent thereof.

By "proper quantities" I mean quantities which will leave on the paper, when the solvent is dried off, sufficient color in the oil and butyrate base to make a proper mark on the paper.

By "cellulose acetate butyrate" is meant the type thereof which contains 13% acetyl and 37% butyryl. It is known that there is at least one other type of cellulose acetate butyrate having a different acetyl and butyryl content, but this latter or these other types are not within the intended scope of my invention.

The coating in accord with the invention therefore comprises a substantially homogeneous mixture of 1.75 to 2.75 parts castor oil, .75 to 1.50 parts of coloring material in the form of a coloring agent in an appropriate vehicle, and 1 part of cellulose acetate butyrate.

A drawing which assists in illustrating an embodiment of the invention shows a schematic disclosure of the coating process.

In accord with a preferred embodiment of the invention:

An ink composition is prepared from 1 part cellulose acetate butyrate of the type wherein the content is 13% acetyl and 37% butyryl, 2 to 2.50 parts of castor oil (the practical limits being 1.75 to 2.75 parts), .75 to 1.50 parts of a coloring material derived from mono-sulphonic acid pulp wherein the color is "flushed" and homogeneously mixed with oil as a vehicle in roughly equal proportions, such as the paint known as "flushed alkali blue" 1–1425 Stdd. "Flushing" is, "A dispersing process which converts a water-wet pigment directly to an oil-wet pigment by displacing water with oil." (Page 248, National Paint Dictionary, Stewart.)

The coloring material might alternatively be a dye or pigment in an appropriate vehicle in the above proportion of .75 to 1.50 parts of the mixture, but "flushed" colors have been found the most effective.

The limits on the castor oil-coloring material ratio are set by the fact that an excess of castor oil will produce a tacky coating with a tendency to smudge, while too little castor oil will produce a hard coating which will require an excessive pressure to make a proper mark.

The preparation is as follows:

The castor oil and flushed alkali blue are mixed together until homogeneous.

The cellulose acetate butyrate is then added to the castor oil and flushed color mixture and mixed until there is complete wetting of the butyrate.

The mixture of cellulose acetate butyrate, oil and color is then added to a volatile solvent for the butyrate. The amount of the volatile solvent is controlled by the fact that too much of it will so lower the viscosity of the mixture that it will cling to the paper in insufficient amounts to leave thereon a sufficient color density for proper marking; and by the fact that too little of it will leave the mixture too viscous for proper handling and it has been found that the practical upper limit of viscosity is 1000 centipoises.

In accord with the requirements set out above, the preferred solvent is ethyl acetate in the amount of 4½ parts.

The mixture in the amount of about 4½ pounds for 500 sheets 8½ x 13 is placed in an inking trough 10 as shown in the drawings.

Paper from reel 12 is wound over tension rollers 14 and 16 and then brought in contact with applicator roll 18 which is so mounted in trough 10 as to dip in the ink. The inked coating on one side of the paper is maintained uniform by an equilizer blade schematically shown at 20. The paper is then wound about cold roll 22 and over hot roll 24 at a surface temperature of 160° F. The paper is then subjected to the action of an air blast 25 and/or fans (not shown).

The combined effect of the air blast or fans and the hot roller is to remove the volatile ethyl acetate and to leave deposited on the paper a film composed of solid cellulose acetate butyrate plasticized by an excess of colored castor oil.

The paper so coated is then taken around tension rollers 26 and 28 and collected on wind-up roller 30.

What is claimed is:

1. A pressure-sensitive transfer medium consisting of a sheet of carrier material and a coating thereon, said coating consisting of a homogeneous mixture of 1 part by weight of a cellulose acetate butyrate ester having 13% acetyl and 37% butyryl, 1.75 to 2.75 parts of a non-drying oil and .75 to 1.50 parts of a coloring material.

2. A coating mixture for application to a sheet of carrier material to produce a pressure-sensitive transfer material, said coating mixture consisting of a homogeneous mixture of 1 part by weight of a cellulose acetate butyrate ester having about 13% acetyl and 37% butyryl 1.75 to 2.75 parts of a non-drying oil, .75 to 1.50 parts of a coloring matter and about 4.5 parts of ethyl acetate to reduce the viscosity of said mixture to less than 1000 centipoises.

3. A coating mixture for application to a sheet of carrier material to produce a pressure-sensitive transfer material, said mixture consisting of 1 part by weight of a cellulose acetate butyrate ester having about 13% acetyl and 37% butyryl, 1.75 to 2.75 parts of a non-drying castor oil, .75 to 1.50 parts of a flushed alkali type of coloring matter and about 4.5 parts of ethyl acetate in which said ester is soluble.

4. A pressure-sensitive transfer medium including a sheet of carrier material and a coating thereon, said coating consisting of 1 part by weight of a cellulose acetate butyrate having about 13% acetyl and 37% butyryl, 1.75 to 2.75 parts of a non-drying castor oil and .75 to 1.50 parts of a flushed alkali type of coloring matter.

References Cited in the file of this patent
UNITED STATES PATENTS

| | | |
|---|---|---|
| 2,820,717 | Newman | Jan. 21, 1958 |

FOREIGN PATENTS

| | | |
|---|---|---|
| 392,220 | Great Britain | May 15, 1933 |
| 424,495 | Great Britain | Feb. 15, 1935 |

OTHER REFERENCES

Mattiello, vol. II, 1942, page 270.